United States Patent Office 2,826,529
Patented Mar. 11, 1958

2,826,529

MITICIDAL COMPOSITION OF DIALKYL CHLOROPHOSPHATES AND METHOD OF USE

Hymin Shapiro, Detroit, Mich., assignor, by mesne assignments, to Pittsburgh Coke and Chemical Company, a corporation of Pennsylvania No Drawing. Application April 29, 1954
Serial No. 426,588

4 Claims. (Cl. 167—22)

The present invention relates to new miticidal compositions and methods for their use. More particularly, the present invention relates to formulation and use of dialkyl chlorophosphate as a miticide.

An object of the present invention is to provide new miticidal compositions. A further object is to provide new miticidal compositions comprising as an active ingredient dialkyl chlorophosphates, particularly diethyl chlorophosphate. Further objects include provision of means for use of the aforesaid miticidal compositions.

According to the present invention I provide new miticidal compositions comprising dialkyl chlorophosphates having the formula

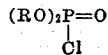

admixed with conditioning agents of the type to be described below. In addition to the above, I provide means of combating mites comprising treating mites as well as the loci of mites with miticidal compositions comprising as a principal active ingredient dialkyl chlorophosphate.

The active ingredient of this invention can be any dialkyl chlorophosphate of the type exemplified by the above formula. The alkyl groups can be the same or different. Representative examples include diethyl chlorophosphate, dimethyl chlorophosphate, di-n-propyl chlorophosphate, diisopropyl chlorophosphate, and each of the isomeric dibutyl chlorohosphate, diamyl chlorophosphate, dihexyl chlorophosphate, diheptyl chlorophosphate, dioctyl chlorophosphate, dinonyl chlorophosphate, didecyl chlorophosphate, diundecyl chlorophosphate, didodecyl chlorophosphate, methylethyl chlorophosphate, methyl-n-propyl chlorophosphate, methylhexyl chlorohposphate, ethyl-n-propyl chlorophosphate, ethyl-isopropyl chlorophosphate, methyldodecyl chlorophosphate, ethyldodecyl chlorophosphate, and the like. Although chlorophosphates having alkyl groups containing more than 12 carbon atoms are satisfactory, it is preferred to use those containing 12 or less carbons in each alkyl group for reasons of availability. The dialkyl chlorophosphates in which the R groups are the same are preferred over those having two different alkyl groups. Diethyl chlorophosphate is an outstanding miticide among the compounds of this invention.

It has been found that dialkyl chlorophosphates are superior miticides and far surpass in effectiveness commercial miticides presently used, such as 2-hydroxy-2,2-bis-(4-chlorophenyl)-alkyl acetate (G–338) and Parathion.

The active ingredients can be prepared by reaction of alcohols with phosphorus trichloride to produce dialkyl hydrogen phosphonates and subsequent chlorination of these materials with chlorine to yield dialkyl chlorophosphates. For example, ethanol is reacted with phosphorus trichloride to produce diethyl hydrogen phosphonate, which on chlorination with chlorine yields diethyl chlorophosphate.

For maximum effectiveness the active ingredients of the present invention are admixed in miticidally effective amount with a conditioning agent of the type commonly referred to as a pest control adjuvant or modifier. In order to provide formulations particularly adapted for ready and efficient application to pests using conventional equipment, such formulations comprise those of both the liquid and solid types as well as the "Aerosol" type formulations. In the pure state my active ingredients may be too effective or too potent in some applications to have practical utility as miticides. For example, for most effective protection, it is preferred to apply my materials in intimate contact but thoroughly dispersed on the material to be protected. Therefore, in order to benefit from my discovery that the defined materials are effective miticides, I incorporate therewith a relatively inert surface-active agent or adjuvant as a dispersing medium. Furthermore, such adjuvants have the effect of requiring only minute quantities of the above defined active ingredients in some formulations to obtain effective protection. A further advantage of so extending this material is to permit field application by methods readily employed and still obtain effectively complete coverage of the material being protected.

The formulations of this invention, therefore, comprise the hereinabove defined miticidally active ingredients and a suitable material as an adjuvant or conditioning agent therefor. It is not intended that this invention be limited to any specific proportions of active ingredient and adjuvant. The important feature of the invention is to provide an adjuvant such that upon the preparation of a formulation of such concentration as appropriate for application, the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with the carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "conditioning agent" include solid carriers of the type of pyrophyllite, kieselguhr, diatomaceous earth, and the like; and various mineral powders, such as calcium sulfate and the like, which act as a dispersant, as a carrier, and in some instances perform the function of a surface-active agent. Preferable conditioning agents are those which are either neutral or mildly acidic, as alkaline agents, especially those which are strongly alkaline, tend to have some deteriorating effect on my active ingredients.

One method of applying these miticides is in the form of a water suspension. However, to obtain a miticidally active aqueous suspension, I employ a surface-active agent in sufficient amount to disperse and suspend the miticidal agent. Examples of such surface-active agents which can be employed in forming dispersions include salts of the alkyl and alkylaryl sulfonates, such as Du Pont MP–189 and Nacconol-NR, a sodium salt; alkyl sulfates, such as Dreft; alkylamide sulfonates, including fatty methyl taurides such as Igepon-T; the alkylaryl polyether alcohols, such as Triton X-100; the fatty acid esters of polyhydric alcohols, such as Span; the ethylene oxide addition products of such esters, as for example Tween, a hexitol product; and the addition products of long-chain mercaptans and ethylene oxide, such as Sharples' Non-Ionic-218. Still other surface-active agents can be employed, the above merely showing a representative list of the more common materials.

In the examples which follow, all parts are parts by weight.

*Example I*

A formulation of diethyl chlorophosphate is prepared by adding with vigorous agitation 10 parts of this material to 1000 parts of water containing one part of Tween-80. This concentrated dispersion is further diluted 1000 times by the addition of water to obtain a formulation of suitable concentration for application. Thus, the resulting dispersion contains 10 p. p. m. of my miticide in the water dispersion.

Similar formulations having good miticidal applicability are prepared using as the active ingredient dimethyl chlorophosphate, didodecyl chlorophosphate, octylamyl chlorophosphate, etc.

The solubility of the active ingredients of this invention in organic solvents, furthermore, is such that they can be applied advantageously in the form of solution in this type of solvent, and for certain uses this method of application is preferred. For example, in some treatments it is preferred to apply the miticides dissolved in a volatile solvent. After use the volatile solvent evaporates, leaving the miticidal agent impregnated throughout the surface of the treated material and in the dispersed form which has been found to be most advantageous. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the miticides, I use hydrocarbons, such as benzene, xylene, or toluene; ketones, such as acetone, methylethyl ketone, and cyclohexanone; chlorinated solvents, such as carbon tetrachloride, trichloro- and perchloroethylene; esters such as ethyl, butyl, and amyl acetates; and alcohols, such as ethanol, isopropanol, and amyl alcohols. Other solvents which are employed are the Carbitols and Cellosolves, the former comprising in general the monoalkyl ethers of diethylene glycol, and the latter, the monoalkyl ethers of ethylene glycol. In addition, combinations of these various typical solvents can be employed whereby special volatility and viscosity characteristics can be imparted to the formulations.

*Example II*

A solution consisting of 5 parts of di-n-propyl chlorophosphate in 250 parts of cyclohexanone is prepared by stirring the two constituents for a period of 2 minutes at a temperature of about 25° C. This concentrated solution, suitable for storage or transportation, is further diluted with 99,750 parts of kerosene to form a final dilution of 50 p. p. m. suitable for application.

Solutions can also be prepared in cyclohexanone as well as the other solvents listed above and others of dimethyl chlorophosphate, diethyl chlorophosphate, methylheptyl chlorophosphate, and the like. For example, a solution of diisobutyl chlorophosphate in Carbitol and solvent naphtha is quite elegant.

A preferred formulation of the active ingredient miticide of this invention comprises a wettable powder. In preparing wettable powders several formulation procedures are possible. Thus, it is one intention of this invention to provide compositions comprising the active ingredients defined herein in combination with a minor amount of a surface-active agent. Such surface-active agent can be chosen, for example, from among the following: alkyl and alkaryl sulfonates, such as Du Pont MP-189 and Nacconol-NR; alkyl sulfates, such as Dreft; alkylamide sulfonates, such as Igepon-T; the alkylaryl polyether alcohols, such as Triton X-100; the fatty acid esters of polyhydric alcohols, such as Span; the ethylene oxide addition products of such esters, as for example Tween; and the addition products of long-chain mercaptans and ethylene oxide, such as Sharples' Non-Ionic-218. Still other surface-active agents can be employed, the above merely showing a representative list of the more common materials. Many of these materials will dissolve in my new active ingredients, while others form suspensions. Such formulations can be readily admixed with a dust carrier. Formulations thus formed then comprise an active ingredient of this invention, a surface-active agent, and the inert carrier. Among the inert carriers which can be employed in thus preparing wettable powders are, for example, soybean flour, tobacco flour, walnut shell flour, wood flour, sulfur, tripolite, diatomite, gypsum, mica, pyrophyllite, kaolinite, apatite, and pumice. In preparing such concentrated wettable powders it is preferred to employ between about 0.1 and 5 percent of the surface-active agent based upon the amount of active ingredient, and up to 85 percent of the inert carrier based upon the total amount of the formulation. Such formulations provide the advantage of permitting storage and transportation of the miticide and permit further dilution by simple admixture with water at the time of application. Thus, within the scope of this invention is also contemplated finished formulations for direct application comprising the miticides as defined herein, surface-active agents as illustrated above, and inert solid carriers as likewise illustrated above, all suspended in water. Such finished formulations, depending upon the application in mind, can include between about 0.1 to 10,000 p. p. m. of active ingredient. A preferred range for agricultural application is between 0.1 and 2,000 p. p. m. Typical formulations of such wettable powders of this invention are illustrated in the following examples, wherein the active ingredient of this invention is employed as the miticide.

*Example III*

A mixture of 100 parts of diethyl chlorophosphate, 1000 parts of pumice, and 0.1 part of Nacconol is intimately admixed in an L-shaped blender. The 10 percent wettable powder thus prepared produces a satisfactory water suspension when 11 parts are stirred into 10,000 parts of water to produce a suspension containing 100 p. p. m. active ingredient.

Similar formulations can be prepared with diamyl chlorophosphate, methyldecyl chlorophosphate, diisopropyl chlorophosphate, and the like.

In addition to the above described methods of wet application of the active ingredient of this invention, compositions can be prepared in which the material is extended in clay or other solid diluents. Such carriers perform the conditioning agent function as contact agents. Further specific examples of such typical inert solid carriers which can be employed as diluents in the dust formulations include fuller's earth, pyrophyllite, Attaclay, and the Filtrols.

*Example IV*

A dust formulation of the miticide is prepared as follows: One part of dihexyl chlorophosphate is placed in a ball mill with 100 parts of fuller's earth. This mixture is milled for a period of one hour and screened to collect a fraction passing a 100-mesh sieve. This one percent by weight formulation can be applied directly or further diluted. A further dilution is made by repeating the above procedure with an additional 9,900 parts of fuller's earth.

Good results are obtained with similar formulations prepared with other active ingredients of this invention, e. g. diethyl chlorophosphate, dimethyl chlorophosphate, methylbutyl chlorophosphate, etc.

For certain applications it is preferred to employ the miticides in the form of oil-in-water emulsions. Thus, a concentrate of the miticidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

*Example V*

An oil-in-water emulsion is prepared by dissolving 10 parts of didodecyl chlorophosphate in 1000 parts of kerosene. This solution is dispersed with vigorous agitation in 99,000 parts of water containing 1 part of Triton X–100 to provide a dispersion containing 10 p. p. m. of active agent. Oil-in-water emulsions of the other active ingredients of this invention are easily made and are very suitable.

In addition, I have found that I can incorporate an adherent or sticking agent, such as vegetable oils, naturally occurring gums, and other adhesives, in my formulations. Likewise, I can employ humectants in my formulations. Furthermore, these formulations can be employed in admixture with other miticidal materials or other biocides, such as insecticides, larvicides, bactericides, vermicides, fungicides, or with other materials which it is desired to apply along with my miticides.

My compounds also find effective use when formulated in "Aerosol" type formulations; that is, when mixed with a liquid of low boiling point that changes to a gas when released from a confined space. Examples of this type diluent are fluorinated hydrocarbons, such as tetrafluoromethane and hexafluoroethane; mixed halogenated compounds containing fluorine and chlorine, such as difluorodichloromethane, pentafluorochloroethane; or ethylene substituted with both these halogens. Compounds containing fluorine and bromine are also applicable, as, for example, trifluorobromomethane. Other materials such as carbon dioxide, sulfur dioxide, and hydrogen sulfide, can be used, and of these carbon dioxide is preferred. One method of preparing such "Aerosol" formulations comprises introducing my new active ingredient into a pressure cylinder and later introducing the liquefied diluent under pressure, followed by mixing the cylinder to obtain uniform solution. If desired, smaller containers can then be filled from the cylinder in which the formulation is made up. In many cases it is desirable to add a second solvent to the low boiling material of the type described above, so as to more readily dissolve my active ingredient. Examples of such co-solvents are benzene, acetone, carbon tetrachloride, butyl acetate, Cellosolve, and the like.

*Example VI*

Into a cylinder rated at 500 p. s. i. working pressure, is introduced 10 parts of diethyl chlorophosphate. The cylinder is then made pressure-tight except for one opening, through which is introduced a mixture of 50 parts acetone and 50 parts dichlorodifluoromethane from a container at 2000 p. s. i. The cylinder into which the ingredients are introduced is then sealed off and inverted to give a uniform "Aerosol" solution of my active material in the mixture of co-solvents.

The utility of my materials in miticidal application can be illustrated by the following examples contrasting their effectiveness with present day commercial miticides.

The spider mite test is conducted as follows: adult two-spotted spider mites, *Tetranychus bimaculatus*, serve as the test species. The stock culture is maintained on Tendergreen beans under greenhouse conditions. Test mites are transferred by leaf cuttings to the uninfested plants the day prior to testing. Formulations of active materials, prepared by dissolving the active ingredient in acetone, adding an aqueous solution of a surface-active agent, and further dilution of this mixture with distilled water, are spread onto the infested test plants by a turntable application method. Counts are made after one day to determine the immediate effects of the chemical upon adult mites.

In such a test an active ingredient of the present invention, diethyl chlorophosphate, was 90 percent effective at a concentration of 30 p. p. m., whereas the commercial material, 2-hydroxy-2,2-bis-(4-chlorophenyl)-ethyl acetate, commonly known as "chlorobenzilate," gave a kill of only 77 percent at a concentration of 50 p. p. m.

In a similar test against the citrus mite diethyl chlorophosphate had an average kill after two days of 91 percent at a concentration of 0.001 percent, whereas Parathion at a concentration of 0.0025 percent had an average kill of only 64 percent after two days.

The other active ingredients of this invention, including dimethyl chlorophosphate, dihexyl chlorophosphate, methylamyl chlorophosphate, ethylpropyl chlorophosphate, and the like, are similarly effective. All the active ingredients of this invention also exert a systemic miticidal effect when applied to the soil in which the plants are growing.

Thus, the new miticides of my invention are shown to be eminently superior to two present day accepted miticides.

I claim:

1. A method of combating mites comprising treating the mites externally and the mite habitats with a miticidal composition comprising diethyl chlorophosphate together with an inert surface active miticidal adjuvant as a carrier therefor.

2. Miticidal composition suitable for external application to mites comprising dialkyl chlorophosphates whose alkyl groups contain 1 to 12 carbon atoms together with an inert surface active miticidal adjuvant as a carrier therefor.

3. Composition of claim 2 wherein the dialkyl chlorophosphate is diethyl chlorophosphate.

4. A method of combating mites comprising treating the mites externally and the mite habitats with a miticidal composition comprising dialkyl chlorophosphates whose alkyl groups contain 1 to 12 carbon atoms together with an inert surface active agent and a mineral powder as a carrier therefor.

References Cited in the file of this patent

UNITED STATES PATENTS

| | | |
|---|---|---|
| 1,816,441 | Peet | July 28, 1931 |
| 2,472,269 | Shirley | June 7, 1949 |

FOREIGN PATENTS

| | | |
|---|---|---|
| 617,846 | Great Britain | Feb. 11, 1949 |

OTHER REFERENCES

Congress Public Law 104, Federal Act of 1947, Sec. 2, Subsec. h. Insecticide, Fungicide and Rodenticide.

Chamberlain et al.: Journal of Economic Entomology, April 1951, pages 177–191.

Bottger et al.: United States Dept. of Agri., Bur. of Entomology and Plant Quarantine Publication No. E 863, September 1953.